United States Patent
Lin et al.

(10) Patent No.: US 12,530,891 B2
(45) Date of Patent: Jan. 20, 2026

(54) QUERY-ORIENTED EVENT RECOGNITION SYSTEM AND METHOD

(71) Applicant: ADLINK Technology Inc., Taoyuan (TW)

(72) Inventors: Chien-Chung Lin, Taoyuan (TW); Chung-Chih Hung, Taoyuan (TW); Ming-Chang Kao, Taoyuan (TW)

(73) Assignee: ADLINK Technology Inc., Taoyuan (TW)

( * ) Notice: Subject to any disclaimer, the term of this patent is extended or adjusted under 35 U.S.C. 154(b) by 460 days.

(21) Appl. No.: 18/062,405

(22) Filed: Dec. 6, 2022

(65) Prior Publication Data

US 2023/0196772 A1    Jun. 22, 2023

(30) Foreign Application Priority Data

Dec. 16, 2021    (TW) .................. 110147184

(51) Int. Cl.
  *G06F 16/00*    (2019.01)
  *G06V 20/40*    (2022.01)
  *G06V 20/52*    (2022.01)

(52) U.S. Cl.
  CPC .............. *G06V 20/44* (2022.01); *G06V 20/52* (2022.01)

(58) Field of Classification Search
  CPC .................. G06F 16/00; G06F 16/23
  See application file for complete search history.

(56) References Cited

U.S. PATENT DOCUMENTS

| | | | |
|---|---|---|---|
| 2012/0170902 A1* | 7/2012 | Zhu | G06F 16/78 707/769 |
| 2013/0159309 A1 | 6/2013 | Birdwell et al. | |
| 2018/0246966 A1 | 8/2018 | Liu et al. | |
| 2021/0216851 A1* | 7/2021 | Lee | G06N 3/042 |
| 2021/0326371 A1 | 10/2021 | Bui et al. | |

FOREIGN PATENT DOCUMENTS

| | | |
|---|---|---|
| CN | 113707323 A | 11/2021 |
| TW | 201108007 A | 3/2011 |
| TW | 201931067 A | 8/2019 |
| TW | 202101337 A | 1/2021 |

\* cited by examiner

*Primary Examiner* — Cheryl Lewis

(57) ABSTRACT

A query-oriented event recognition system includes a capturing unit, an analyzing inference engine assembly, a synchronization processing unit and an event definition unit. The capturing unit is configured to capture at least one data flow including a plurality of time points and data, and each time points is corresponding to a data. The analysis and inference engine assembly includes a plurality of inference engines. The analysis and inference engine assembly is configured to analyze and reason the data of the time points by the inference engines to generate at least one inference data corresponding to the data at each time point. The synchronization processing unit is configured to generate an inference data set corresponding to each time point according to the data flow and the inference data. The event definition unit is configured to find an event query result matching up with the inference data set through a query statement.

11 Claims, 7 Drawing Sheets

QUERY-ORIENTED EVENT RECOGNITION SYSTEM AND METHOD

BACKGROUND OF THE INVENTION

1. Field of the Invention

The present invention relates to a query-oriented event recognition system, and more particularly, to an inference and query-oriented event recognition system based on an artificial intelligence (AI).

2. Description of the Prior Art

In recent years, with the booming development of artificial intelligence (AI), the applications in edge computing through the machine learning or deep learning have become more and more widespread.

The pipeline architecture usually includes AI inference engines to perform training on a large amount of data for the application scenarios with corresponding algorithms, so as to generate suitable inference module. In general, the inference module of the AI inference engine is usually trained to a sufficient level of understanding to reduce the complexity of subsequent event identification, so as to further reduce analysis time and increase analysis efficiency. However, the development process of the inference module (e.g., training sample data collection, supervised learning, model optimization, logic algorithm design) will be time-consuming and costly for training the inference module to the sufficient level of understanding. Furthermore, some application scenarios may not be able to obtain a large of training sample data, which may prolong the construction process of the inference engine.

On the other hand, a new inference module must be trained or a new logic algorithm must be redeveloped for a new application scenario even though there is an existing inference module with the sufficient level of understanding. The existing inference module cannot be reused to identify events in the new application scenario, so it would not only increase the development cost but also significantly reduce the practicality and analysis efficiency.

Therefore, it is necessary to develop a new event recognition system to solve the problems of the prior art.

SUMMARY OF THE INVENTION

In view of this, one scope of the present invention is to provide a query-oriented event recognition system to solve the problems of the prior art. According to an embodiment of the present invention, the query-oriented event recognition system includes a capturing unit, an analysis and inference engine assembly, a synchronization processing unit and an event definition unit. The capturing unit is configured to capture at least a data flow; wherein, the data flow comprises a plurality of time points and data, and each of the time points is corresponding to one of the data. The analysis and inference engine assembly is connected to the capturing unit. The analysis and inference engine assembly comprises a plurality of inference engines. The analysis and inference engine assembly is configured to analyze and reason the data of the time points by the inference engines to generate at least one inference data corresponding to the data at each of time point. The synchronization processing unit is connected to the analysis and inference engine assembly. The synchronization processing unit generates an inference data set corresponding to each of the time points according to the at least one data flow and the at least one inference data. The event definition unit is connected to the synchronization processing unit. The event definition unit finds an event query result matching up with the inference data set by a query statement.

Wherein, the inference engines are connected in at least one of series or parallel.

Wherein, the query-oriented event recognition system further comprises a judging and warning unit. The judging and warning unit is configured to generate a warning signal on the basis of the hazard level of the event query result.

Wherein, the event definition unit comprises a first event definition unit and a second event definition unit. The first event definition unit finds a first event query result matching up with the inference data set by a first query statement, and the second event definition unit finds a second event query result matching up with the first event query result and the inference data by a second query statement.

Wherein, at least one inference data is stored in the metadata.

Wherein, the query-oriented event recognition system further comprises a storage unit. The storage unit is configured to store at least one inference data.

Wherein, the query statement comprises at least one inference data, and the query statement is selected from at least one of graph theory, set theory, semantics, and logical judgment.

Wherein, the data comprises an image data and sound data.

Another scope of the present invention is to provide a query-oriented event recognition method to solve the problems of the prior art. According to an embodiment of the present invention, the query-oriented event recognition method comprises the following steps of: a capturing unit captures at least one data flow; an analysis and inference engine assembly analyzes and reasons the plurality of data of the plurality of time points in the at least one data flow by the plurality of inference engines to generate at least one inference data corresponding to the data at each of time point; a synchronization processing unit generates an inference data set corresponding to each of the time points based on the data flow and the inference data; and the event definition unit finds an event query result matching up with the inference data set through a query statement.

Wherein, the query-oriented event identification method further comprises the following step: the judging and warning unit generates an alert signal based on the hazard level of the event query result.

Wherein, in the step of finding the event query result matching up with the inference data set by the event definition unit through the query statement, the following steps are further included: the first event unit finds the first event query result matching up with the inference data set through first query statement; and the second event unit finds the second event query result matching up with the first event query result and the inference data through second query statement.

In summary, the query-oriented event recognition system of the present invention can generate inference data of event element of multiple objects at the same time point by a plurality of inference engines, so as to enhance the plasticity of event definitions and event combinations and further improve the practicality. Moreover, the synchronization processing unit of the query-oriented event recognition system of the present invention can integrate the information and inference data at the same time point to increase the correctness of the data and the accuracy of system analysis.

Furthermore, the query-oriented event recognition system of the present invention can quickly query whether the inference data set at each time point matches up with the necessary elements at the time of the event occurring by the event definition unit, thereby improving efficiency. The query-oriented event recognition system of the present invention can also alert or automatically perform subsequent processing operations based on the event query results through the judging and warning unit to enhance convenience and practicality. In addition, the query-oriented event recognition system of the present invention can identify other events from the identified events through the multiple event definition unit series connected with each other, instead of re-entering the query statement, re-analyzing and re-reasoning to improve efficiency and reduce time cost.

BRIEF DESCRIPTION OF THE APPENDED DRAWINGS

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of this specification, the description with reference to the terms "an embodiment", "another embodiment" or "part of an embodiment" means that a particular feature, structure, material or characteristic described in connection with the embodiment including in at least one embodiment of the present invention. In this specification, the schematic representations of the above terms do not necessarily refer to the same embodiment. Furthermore, the particular features, structures, materials or characteristics described may be combined in any suitable manner in one or more embodiments. Furthermore, the indefinite articles "a" and "an" preceding a device or element of the present invention are not limiting on the quantitative requirement (the number of occurrences) of the device or element. Thus, "a" should be read to include one or at least one, and a device or element in the singular also includes the plural unless the number clearly refers to the singular.

Figure 1:
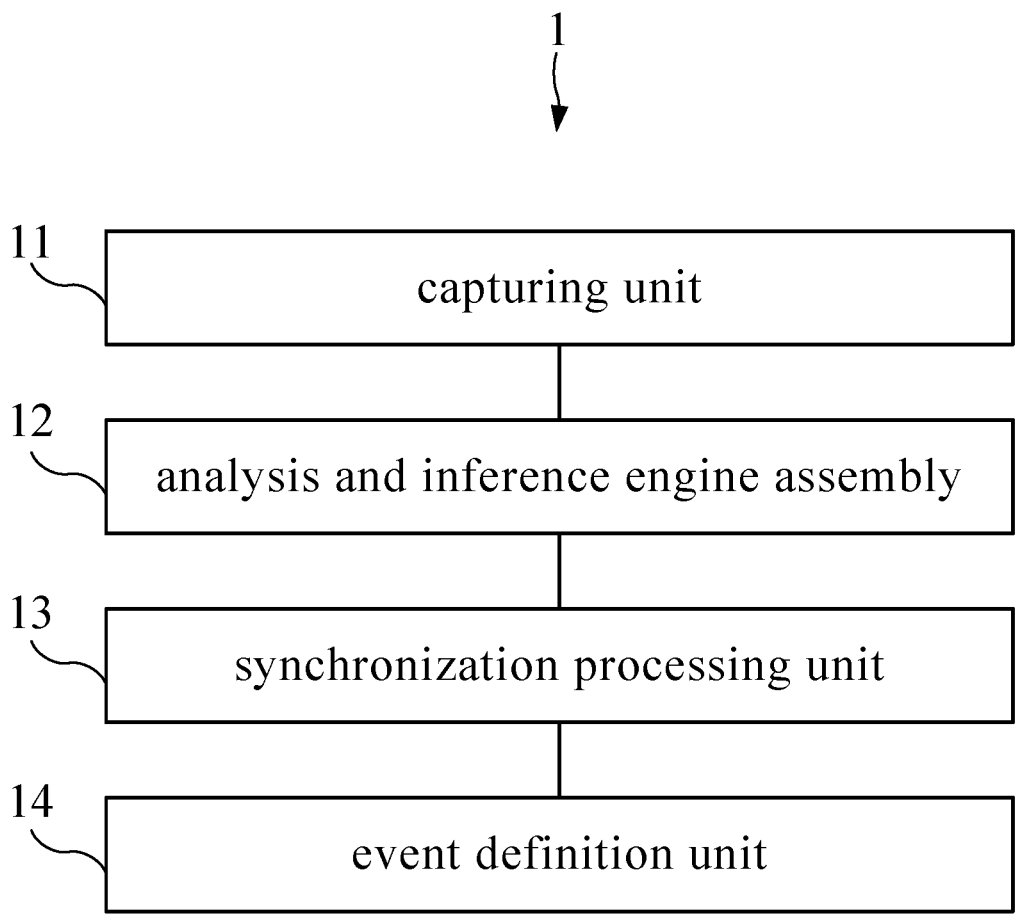
FIG. 1 is a function block diagram illustrating a query-oriented event recognition system according to an embodiment of the present invention.
Figure 2:
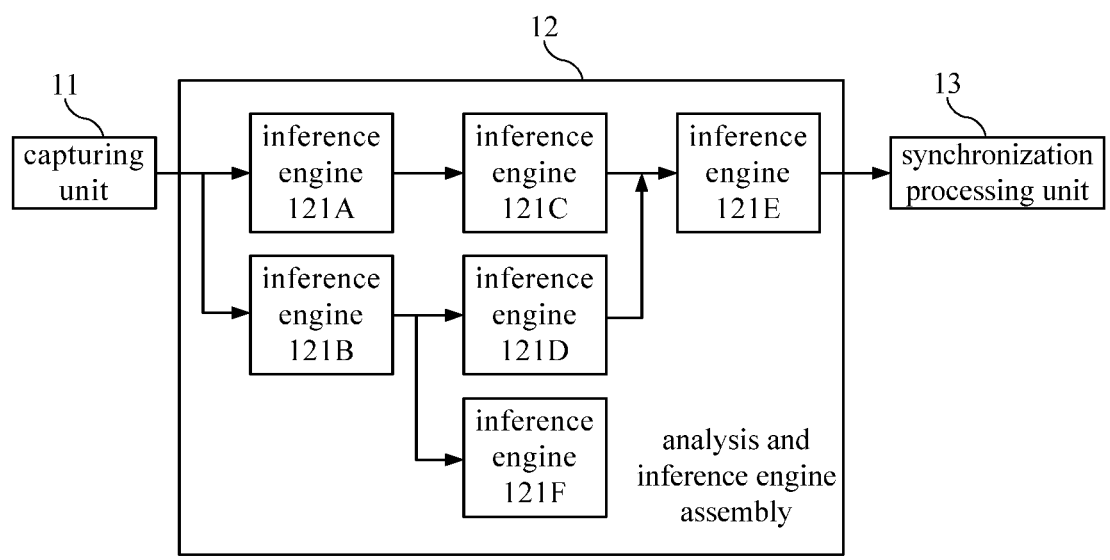
FIG. 2 is a function block diagram illustrating a capturing unit, an analysis and inference engine assembly, and a synchronization processing unit according to an embodiment of the present invention.
Figure 3A:
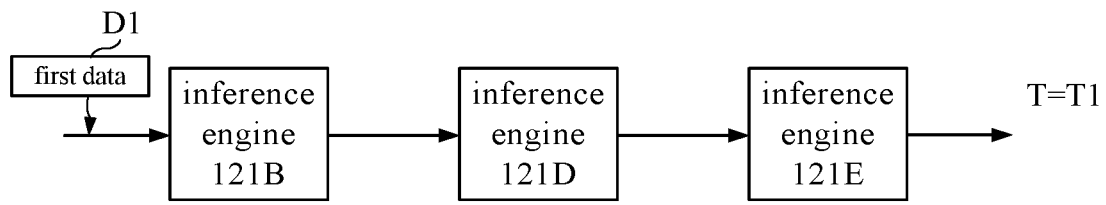
FIG. 3A to FIG. 3C are sequence diagrams illustrating the data flow and the analysis and inference engine assembly, respectively.
Figure 3B:
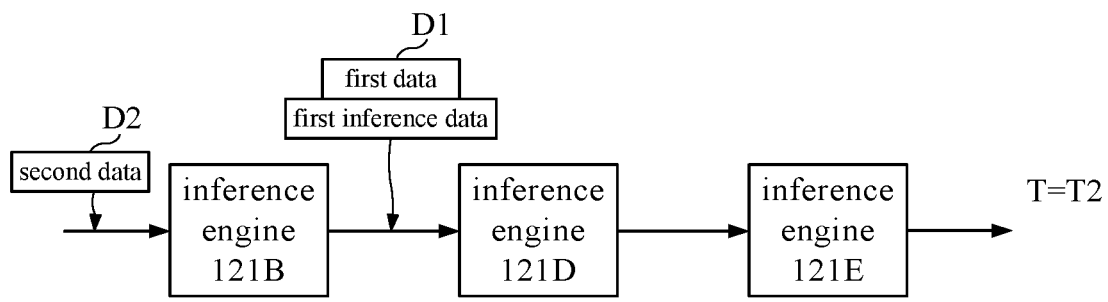
Figure 3C:
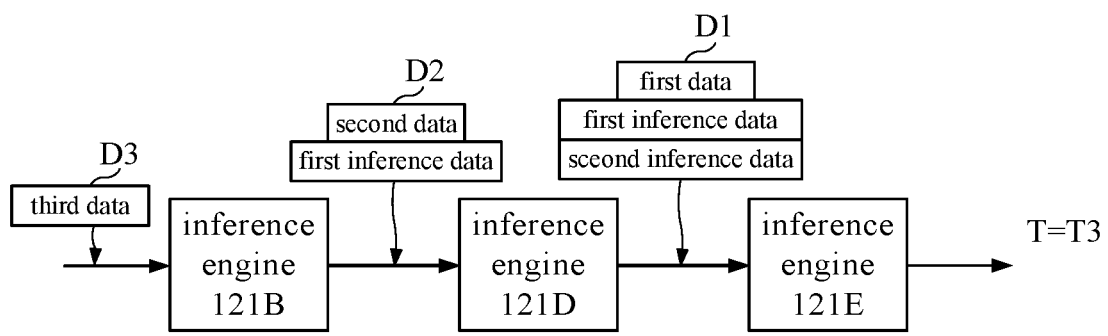

Please refer to FIG. 1, FIG. 2 and FIG. 3A to FIG. 3C. FIG. 1 is a function block diagram illustrating a query-oriented event recognition system 1 according to an embodiment of the present invention. FIG. 2 is a function block diagram illustrating a capturing unit 11, an analysis and inference engine assembly 12, and a synchronization processing unit 13 according to an embodiment of the present invention. FIG. 3A to FIG. 3C are sequence diagrams illustrating the data flow and the analysis and inference engine assembly 12, respectively. As shown in FIG. 1, in this embodiment, the query-oriented event recognition system 1 comprises a capturing unit 11, an analysis and inference engine assembly 12, a synchronization processing unit 13, and an event definition unit 14. The capturing unit 11 is connected to the analysis and inference engine assembly 12. The analysis and inference engine assembly 12 is connected to the synchronization processing unit 13. The synchronization processing unit 13 is connected to the event definition unit 14.

In practice, the capturing unit 11 can be a data capturing device, and the analysis and inference engine assembly 12, the synchronization processing unit 13, and the event definition unit 14 can be a computing chip or a processing chip integrated in a computing device (e.g., a computer or a server). The data capturing device can communicate with the computing device by wired or wireless connection. In another embodiment, the capturing unit 11 can be a data capturing chip, and the analysis and inference engine assembly 12, the synchronization processing unit 13, and the event definition unit 14 can be integrated in a chip. The capturing unit 11, the analysis and inference engine assembly 12, the synchronization processing unit 13, and the event definition unit 14 can be integrated in the same or different computing devices.

In the present embodiment, the capturing unit 11 is configured to capture the data flow. Wherein, the data flow comprises the plurality of time points and the plurality of data, and each of time points is corresponding to a data. In practice, when the capturing unit 11 is a capturing device, the capturing unit 11 can capture and record a continuous and sequential data flow. For example, if the capturing unit 11 is a camera, the capturing unit 11 can capture a video signal and each of time points in the video signal is corresponding to an image data. If the capturing unit 11 is a microphone, the capturing unit 11 can record an audio signal and each of time points in the audio signal is corresponding to a sound data. On the other hand, if the capturing unit 11 is a data capturing chip, the capturing unit 11 can capture multiple time points and corresponding image data and sound data at the time points from recorded or stored image files or audio files. In addition, the capturing unit 11 can capture the data from multiple data flows at the same time. In practice, the capturing unit 11 can capture image files and audio files at the same time, and each of time points is corresponding to an image data and a sound data.

It is worth noting that the types of data in the data flow are not limited to the above-mentioned image data and sound data, and the types of capturing unit is not limited to the aforementioned. In practice, the data can be one-dimensional data (e.g., seismic waveform, wave range, stocks prices), two-dimensional data (e.g., terrain height, population density distribution), or multidimensional data (e.g., eigenvector). The capturing unit can be a device or chip to capture the corresponding type of data.

In this embodiment, the analysis and inference engine assembly 12 comprises a plurality of inference engines. The analysis and inference engine assembly 12 analyzes and reasons the plurality of time points and the plurality of data in the data flow through the plurality of inference engines to generate inference data respectively corresponding to the data at each of the time points. In practice, the plurality of inference engines can be configured to analyze and reason different objects in the data captured by the capturing unit 11, respectively. For example, when the data flow captured by the capturing unit 11 is the image data of the road, the inference engines of the analysis and inference engine assembly 12 can comprise vehicle inference engines, pedestrian inference engines, traffic signal inference engines, etc., for analyzing the inference data of "vehicle is stationary", "pedestrian is in the middle of the road", "traffic signal is red", etc., according to the image data of the road. The inference engines can be generated through supervised learning, unsupervised learning, semi-supervised learning, reinforcement learning, and other deep learning network architectures by analyzing large amounts of object information and data.

Furthermore, in the embodiment, the inference engines of the analysis and inference engine assembly 12 can be connected in at least one of series or parallel. In practice, as shown in FIG. 2, the plurality of inference engines of the analysis and inference engine assembly 12 can comprise series connection (e.g., the inference engine 121A and the inference engine 121C, the inference engine 121B and the inference engine 121D), parallel connection (e.g., inference engine 121A and inference engine 121B, the inference engine 121C and the inference engine 121D, the inference engine 121D and the inference engine 121F), parallel connection after series connection, and series connection after parallel connection. The inference data generated by one of the inference engines can be used as the input data for another of the inference engines.

In practice, the inference engine 121A can be a pedestrian inference engine, the inference engine 121B can be a vehicle inference engine, the inference engine 121C can be a posture inference engine, and the inference engine 121D can be a position inference engine. When the data flow captured by the capturing unit 11 is the image data of the road and the analysis and inference engine assembly 12 analyzes the image data, the inference engine 121A can firstly reason and identify the pedestrians located at the crosswalk according to the image data, and then the inference engine 121C reasons the posture (e.g., standing, lying down, walking) of the pedestrian at the crosswalk. The inference engine 121B can reason and identify the vehicles on the road according to the image data first. Next, the inference engine 121D reasons the location of the vehicle on the road. It should be noted that when the analysis and inference engine assembly 12 analyzes the image data, the inference engine 121A and the inference engine 121B can perform analysis and inference according to the image data at the same time.

Furthermore, the inference engine 121E can be an intersection inference engine to perform further analysis according to the inference data of the inference engine 121C and the inference engine 121D. In practice, the inference engine 121E can respectively mark the pedestrians and vehicles in the inference data by object windows, and reason whether the object windows of the pedestrians and the object windows of the vehicles are intersected or overlapped with each other to generate the inference data. In addition, the inference engine 121F can be an audio inference engine. When the data flow captured by the capturing unit 11 comprises image data and sound data of the road, the inference engine 121F can reason whether a vehicle generates sound (e.g., crash sound, brake sound) according to the inference data and audio data generated by the inference c engine 121B.

It is worth noting that the number and the connections of inference engines of the analysis and inference engine assembly 12 are not limited to those in FIG. 2. In practice, the types, the number, and the connections of the inference engines of the analysis and inference engine assembly can be determined according to the design requirements. The analysis and inference engine assembly can also comprise multiple inference engine sets for different application scenarios, and the inference engine sets can respectively comprise a plurality of inference engines corresponding to the objects in the application scenarios. After the capturing unit captures the data flow of different application scenarios, the analysis and inference engine assembly can use the inference engine sets corresponding to the application scenarios for analysis. In addition, the input data for each inference engine is not limited to the inference data generated by the previous inference engine. In practice, the input data of each inference engine may be the data of the data flow, a part of the inference data generated by the previous inference engine, or the data of the data flow and a part of the inference data generated by the previous inference engine.

In the embodiment, since the data captured by the capturing unit 11 is continuous and sequential, the inference engines of the analysis and inference engine assembly 12 analyze and reason the data at the plurality of time points in the data flow in a sequential manner. In practice, as shown in FIG. 2 and FIG. 3A to FIG. 3C, the data flow captured by the capturing unit can comprise continuous first data D1, second data D2 and third data D3. The first data D1, the second data D2 and the third data D3 are corresponding to continuous first time point T1, second time point T2 and third time point T3, respectively. In FIG. 3A, at the first time point T1, the inference engine 121B of the analysis and inference engine assembly analyzes and reasons a first data. In FIG. 3B, at the second time point T2, the inference engine 121B analyzes and reasons the second data and simultaneously generates a first inference data corresponding to the first data, and the inference engine 121D analyzes and reasons the first inference data of the first data. In FIG. 3C, at the third time point T3, the inference engine 121B analyzes and reasons the third data and simultaneously generates a first inference data corresponding to the second data; the inference engine 121D analyzes and reasons the first inference data of the second data and simultaneously generates a second inference data corresponding to the first data; and, the inference engine 121E analyzes and reasons the second inference data of the first data.

Furthermore, the inference data generated by the inference engine can be stored in the metadata. In FIG. 3B, at the second time point T2, the first inference data corresponding to the first data generated by the inference engine 121B is stored in the metadata in addition to the inference engine 121D. In FIG. 3C, at the third time point T3, the first inference data corresponding to the second data generated by the inference engine 121B and the second inference data corresponding to the first data generated by the inference engine 121D are both stored in the metadata. Therefore, after the analysis and inference engine assembly 12 analyzes and reasons the data flow captured by the capturing unit 11, the metadata can comprise all inference data generated by all inference engines analyzing and reasoning each of the data in the data flow.

In the present embodiment, the synchronization processing unit 13 generates inference data sets corresponding to each of time point according to the data flow captured by the capturing unit 11 and the inference data generated by the analysis and inference engine assembly 12. In practice, the synchronization processing unit 13 can integrate metadata and the data flow to generate inference data sets. Since the metadata is sequential and corresponds to the data at each of time points in the data flow, the synchronous processing unit 13 respectively forms the inference data sets with the data in the data flow and the inference data in the metadata corresponding to the data at the same time points. For example, as shown in FIG. 2, after the analysis and inference engine assembly 12 analyzes and reasons the first data at the first time point in the data flow captured by the capturing unit 11, the synchronization processing unit 13 can integrate the first data and all inference data corresponding to the first data generated by the inference engine 121A to the inference engine 121F to form the first inference data set. Therefore, the query-oriented event recognition system of the present invention can integrate the data at the same point through the synchronization processing unit to improve the accuracy of the data and the correctness of system analysis.

In the embodiment, the event definition unit 14 finds the event query results matching up with the inference data set through a query statement. In practice, the event definition unit 14 can be connected to an input unit (not shown), and the input unit can be keyboard, mouse, etc. The user can enter the query statement of the event to be queried through the input unit. The query statement can comprise at least an inference data, and the query statement can be at least one of graph theory, set theory, semantics and logical judgment. When the user wants to query the event of "car hitting people", the user can enter the inference data such as "the object window of the pedestrian intersecting with the object window of the vehicle", "the pedestrian in a lying posture", "the vehicle having hazard lights" etc., and the query statement of "intersection of inference data" through the input unit. At the moment, the event definition unit 14 compares all inference data sets generated by the synchronization processing unit 13 with the query statement entered by the user. If the data in one of the inference data sets conforms to the query statement, the event definition unit 14 can mark the inference data set as an event query result of "match" or "the query result is yes". If the inference data set does not conform to the query statement, the event definition unit 14 can mark the inference data set as an event query result of "not match" or "the query result is no". Therefore, the query-oriented event recognition system of the present invention can quickly query whether the inference data sets at each of time points match up with the necessary elements at the time of the event occurring through the event definition unit, so as to improve efficiency.

Furthermore, the user can re-enter or add a new query statement for querying a new event, and the event definition unit 14 can directly compare the data in the inference data sets with the query statement without re-analyzing and re-reasoning process for the data in the data flow for the new event, so as to improve the analysis efficiency and reduce the time cost.

Figure 4:
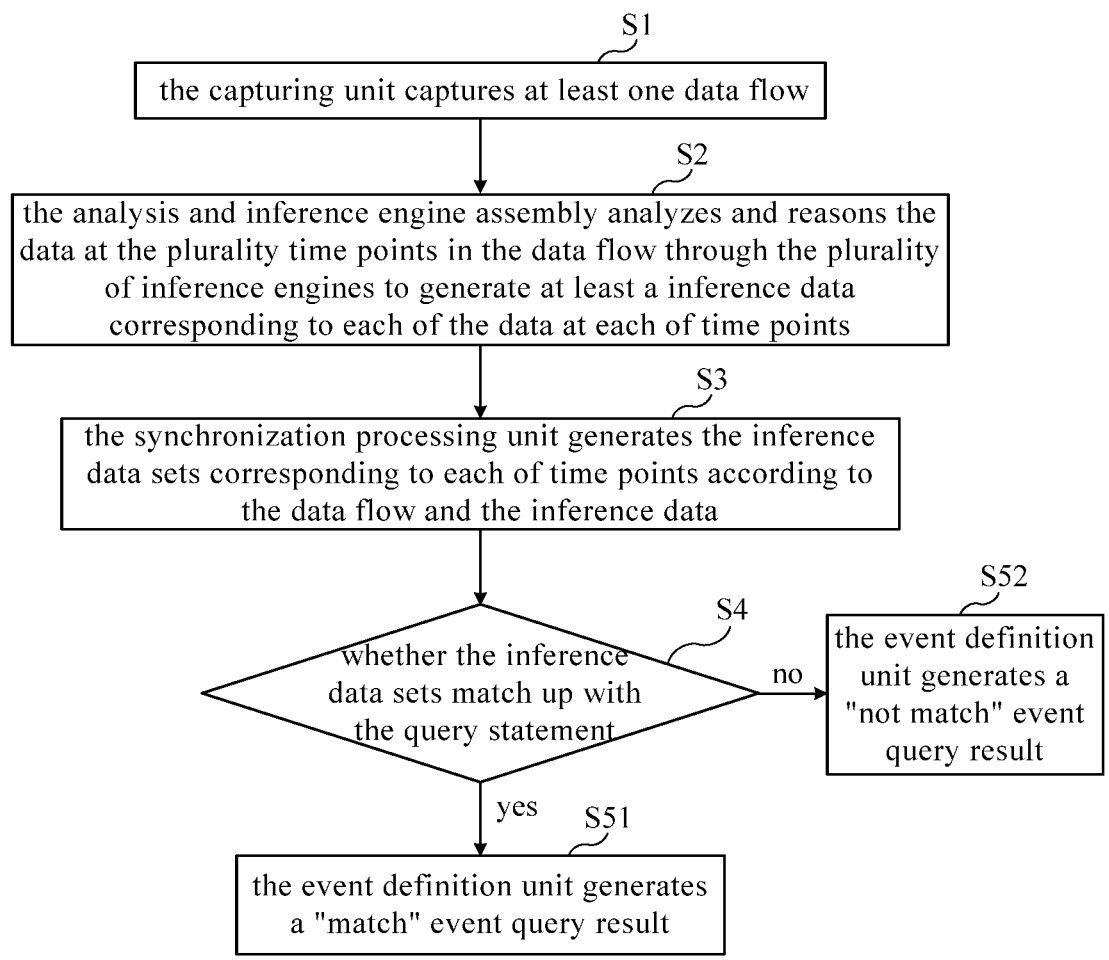
FIG. 4 is a flowchart diagram illustrating the query-oriented event recognition method according to an embodiment of the present invention.

Please refer to FIG. 1 and FIG. 4. FIG. 4 is a flowchart diagram illustrating the query-oriented event recognition method according to an embodiment of the present invention. The steps shown in FIG. 4 can be accomplished by the query-oriented event recognition system 1 in FIG. 1. In the present embodiment, the query-oriented event recognition method comprises the following steps: step S1: the capturing unit 11 capturing at least one data flow, wherein the data flow comprises the plurality of time points and a plurality of data corresponding to the plurality of time points; step S2: the analysis and inference engine assembly 12 analyzing and reasoning the data at those time points with the plurality of inference engines to generate at least a inference data corresponding to each of the data at each of the time points; step S3: the synchronization processing unit 13 generating inference data sets corresponding to each of the time points according to the data flow and the inference data; step S4: the event definition unit 14 comparing the inference data sets according to a query statement and determining whether the inference data sets conform to the query statement; step S51: if the result in step S4 is yes, the event definition unit 14 generating a "match" event query result; and, step S52: if the result in step S4 is no, the event definition unit 14 generating a "not match" event query result.

The step of the event definition unit querying the event through query statement is not limited to the aforementioned. In another embodiment, the event definition unit 14 stores a plurality of query statements. After the synchronization processing unit 13 generates the inference data sets, the event definition unit 14 can respectively compare the inference data sets for each of the time points to the query statements, and generate event query results for all query statements for each of time points. In practice, the query statements can be set according to the design requirements, and can be added and stored in the event definition unit 14 by inputting or importing. The user can input and save new query statement corresponding to a new event in the event definition unit 14 for querying the new event. Therefore, the event definition unit 14 can directly compare the inference data sets generated by the synchronization processing unit 13 to the new query statements and generate the event query results for the inference data sets at each of the time points corresponding to the new query statements.

In another embodiment, the event definition unit 14 pre-stores a list of events, wherein the list of events comprises a plurality of events, and each of event comprises an event name and a query statement. In practice, the user can select and enter an event name of an event through the input unit, and the event definition unit 14 can compare the inference data sets to the query statement corresponding to the event name and generate the event query results. The event name and the query statement of each event in the list of events can be set according to the design requirements, and can also be added and stored in the event definition unit 14 by inputting or importing.

Figure 5:
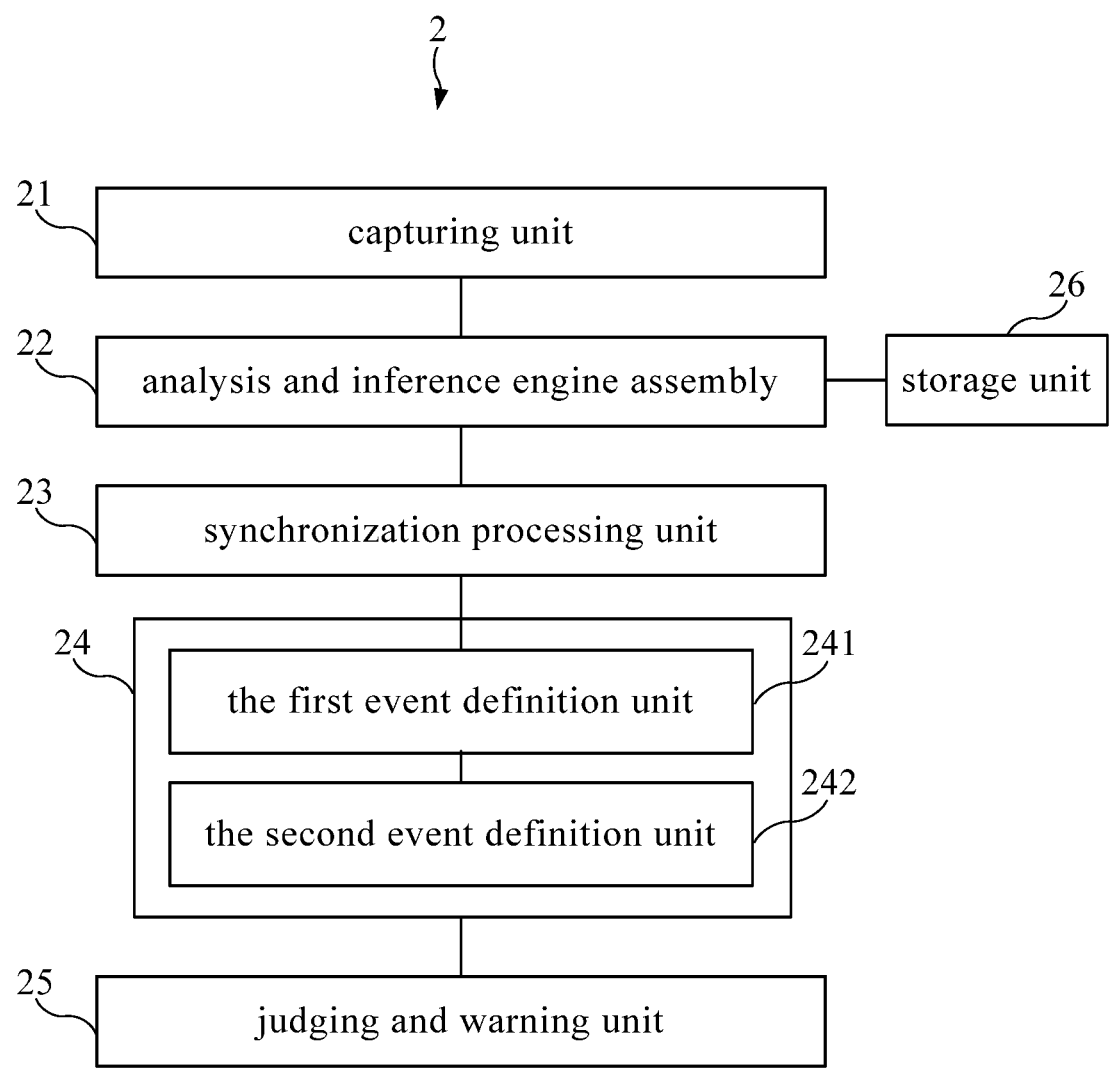
FIG. 5 is a function block diagram illustrating the query-oriented event recognition system according to an embodiment of the present invention.

Please refer to FIG. 5. FIG. 5 is a function block diagram illustrating the query-oriented event recognition system 2 according to an embodiment of the present invention. The present embodiment differs from the previous embodiment in that the query-oriented event recognition system 2 of the embodiment further comprises a judging and warning unit 25. The judging and warning unit 25 is connected to the event definition unit 24 and is configured to generate a warning signal according to a hazard level of the event query result generated by the event definition unit 24. In practice, the judging and warning unit 25 can be an alert device or a warning device performing text, communication, audio, light, etc. When the event query result generated by the event definition unit 24 is "match", the judging and warning unit 25 can generate a warning signal to alert the user. The type of judging and warning unit 25 can be determined on the application scenario. For example, when the application scenario of the query-oriented event recognition system 2 is in a bank, the judging and warning unit 25 can be a reporting device. When the query statements of the bank robbery event comprise the intersections of "person with a covered face", "screaming", "carrying money" and "person with a dangerous object", the event definition unit 24 finds an inference data set matching up with the query statement and generates a "match" event query result. The reporting device can report to the police according to the event query result of bank robbery event. Therefore, the query-oriented event recognition system of the present invention can also automatically perform subsequent process according to the event query results through the judging and warning unit, so as to enhance convenience and practicality.

In the present embodiment, the query-oriented event recognition system 2 further comprises a storage unit 26 for storing the inference data generated by the analysis and inference engine assembly 22. In practice, the storage unit 26 can be a register, cache memory, random access memory, hard disk, tape drive, optical disk drive, cloud system, etc., and the storage unit 26 is connected to the analysis and inference engine assembly 22. When the analysis and inference engine assembly 22 generates the inference data corresponding to the data at each of the time points in the data flow, all inference data can be stored in the storage unit 26. The above-mentioned metadata can also be stored in the storage unit 26. The storage unit 26 can be connected to the synchronization processing unit 23 and the event definition unit 24 for storing the inference data sets generated by the synchronization processing unit 23 and the event query results generated by the event definition unit 24. The event definition unit 24 can also be connected to a display (not shown). The event definition unit 24 can display the data of the inference data set that matches up with the query statement and the time point of the data on the display for the user. The event definition unit 24 can also find and display other event query results and the inference data sets for previous event querying from the storage unit 26 on the display for the user or executing the subsequent process. The functions of the capturing unit 21 are substantially the same as that in the previous embodiment, and would not be described again herein.

In addition, in the embodiment, the event definition unit 24 can comprises a first event definition unit 241 and a second event definition unit 242. The first event definition unit 241 is connected to the synchronization processing unit 23, and the second event definition unit 242 is connected to the first event definition unit 241. The first event definition unit 241 finds a first event query result of the matched inference data set through the first query statement, and the second event definition unit 242 finds a second event query result from the first event query result and the matched inference data set through the second query statement. In practice, the second event definition unit 242 can find the second event query result that matches up with the second query statement from the first event query result that matches up with the first query statement found by the first event definition unit 242. For example, after the user enters the query statement of the "car hit a person" event and the first event definition unit 241 finds the inference data set matching up with the "car hit a person" event according to the query statement, the user can then enter the query statement of the "accident caused by violation" event, wherein the "accident caused by violation" can further comprise the inference data such as "vehicle parked illegally", "pedestrian crossing at red light". The second event definition unit 242 can directly find out the second event query results of the inference data set matching up with the query statement of "violation caused accident" from the inference data set matching up with the event "car hit a person", instead of re-entering the query statements, re-analyzing, and re-reasoning, so as to improve efficiency and reduce time cost.

Figure 6:
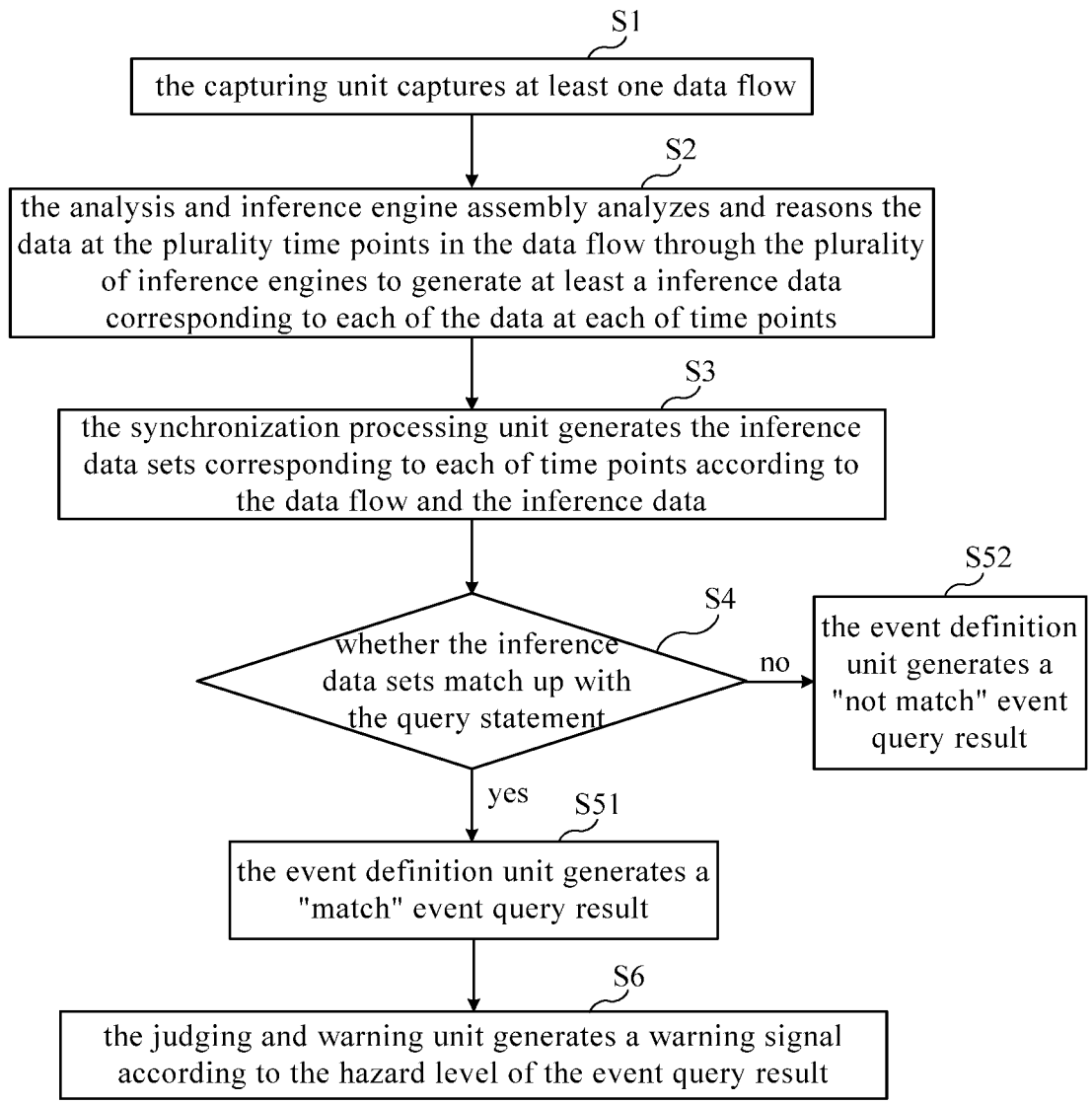
FIG. 6 is a flowchart diagram illustrating a query-oriented event recognition method according to an embodiment of the present invention.

Please refer to FIG. 5 and FIG. 6. FIG. 6 is a flowchart diagram illustrating a query-oriented event recognition method according to an embodiment of the present invention. The steps shown in FIG. 6 can be accomplished by the query-oriented event recognition system 2 in FIG. 5. In the present embodiment, after the capturing unit 21, the analysis and inference engine assembly 22 and the synchronization processing unit 23 respectively perform the step S1 to S3 and the event definition unit 24 generates a "match" event query result (step S51), step S6 is further performed: the judging and warning unit 25 generating a warning signal according to the hazard level of the event query result.

Figure 7:
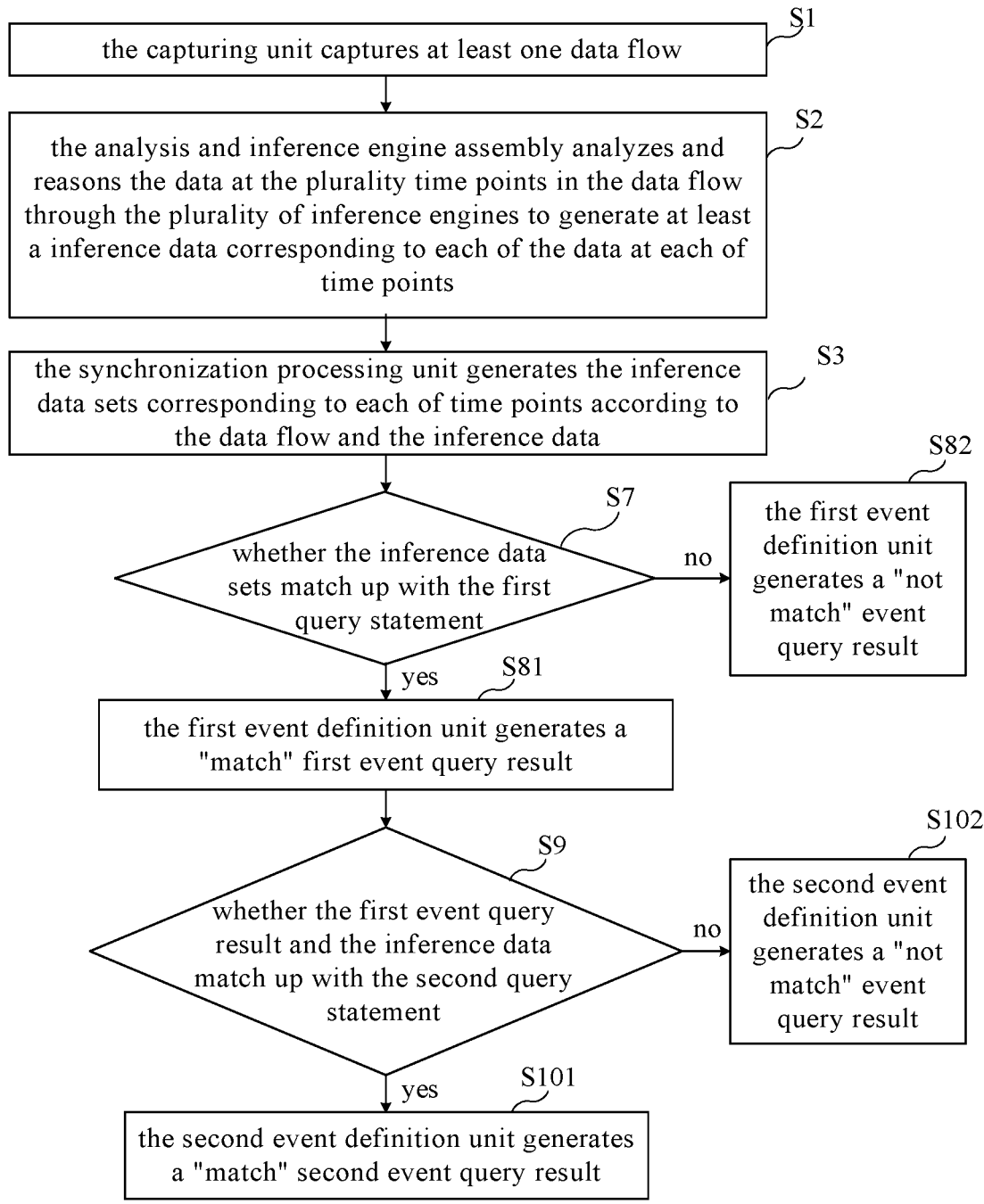
FIG. 7 is a flowchart diagram illustrating a query-oriented event recognition method according to an embodiment of the present invention.

Please refer to FIG. 5 and FIG. 7. FIG. 7 is a flowchart diagram illustrating a query-oriented event recognition method according to an embodiment of the present invention. The steps shown in FIG. 7 can be accomplished by the query-oriented event recognition system 2 in FIG. 5. In the present embodiment, after the capturing unit 21, the analysis and inference engine assembly 22 and the synchronization processing unit 23 respectively perform the step S1 to S3, step S7 is further performed: the first event definition unit 241 comparing the inference data set to the first query statement and to determines whether the inference data set matches up with the first query statement. If the result is no, step S82 is performed: the first event definition unit 14 generating a "not match" event query result; if the judgment result is yes, step S81 is performed: the first event definition unit 241 generating a "match" first event query result. Furthermore, step S9 is performed: the second event definition unit 242 comparing the first event query result and the inference data according to the second query statement, and determining whether the first event query result and the inference data match up with the second query statement. If the result of step S9 is yes, step S101 is performed: the second event definition unit 242 generating a "match" second event query result; if the result of step S9 is no, step S102 is performed: the second event definition unit 242 generating a "not match" event query result.

In summary, the query-oriented event recognition system of the present invention can generate inference data of event elements of multiple objects at the same time point through the plurality of inference engines to enhance the plasticity of event definition and event combination, so as to enhance the practicality. The synchronization processing unit of the query-oriented event recognition system of the present invention can integrate the data and the inference data at the same time point to improve the accuracy of the data and the correctness of the system analysis. The query-oriented event recognition system of the present invention can also quickly query whether the inference data set at each of time points matches up with the necessary elements at the time of the event occurring by the event definition unit, so as to improve efficiency. Furthermore, the query-oriented event recognition system of the present invention can alert or automatically perform subsequent process according to the event query results through the judging and warning unit, so as to enhance convenience and practicality. In addition, the query-oriented event recognition system of the present invention can identify other events from the identified events through the series connections of multiple event definition units, instead of re-entering the query statements, re-analyzing and re-reasoning, so as to improve efficiency and reduce time cost.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A query-oriented event recognition system, comprising:
   a capturing unit, configured to capture at least one data flow, wherein the at least one data flow comprises a plurality of time points and data, and each of the time points is corresponding to one of the data;
   an analysis and inference engine assembly, connected to the capturing unit, wherein the analysis and inference engine assembly comprises a plurality of inference engines, and the analysis and inference engine assembly is configured to analyze and reason the data of the time points by the inference engines to generate at least one inference data corresponding to the data at each of time point;
   a synchronization processing unit, connected to the analysis and inference engine assembly, wherein the synchronization processing unit generates an inference data set corresponding to each of the time points according to the at least one data flow and the at least one inference data; and
   an event definition unit, connected to the synchronization processing unit, wherein the event definition unit finds an event query result matching up with the inference data set through a query statement.

2. The query-oriented event recognition system of claim 1, wherein the inference engines are connected in at least one of series and parallel.

3. The query-oriented event recognition system of claim 1, further comprising a judging and warning unit configured to generate a warning signal according to the hazard level of the event query result.

4. The query-oriented event recognition system of claim 1, wherein the event definition unit comprises a first event definition unit and a second event definition unit, the first event definition unit finds a first event query result matching up with the inference data set by a first query statement, and the second event definition unit finds a second event query result matching up with the first event query result and the at least one inference data by a second query statement.

5. The query-oriented event recognition system of claim 1, wherein the at least one inference data is stored in the metadata.

6. The query-oriented event recognition system of claim 1, further comprising a storage unit configured to store the at least one inference data.

7. The query-oriented event recognition system of claim 1, wherein the query statement comprises the at least one inference data, and the query statement is selected from at least one of graph theory, set theory, semantics, and logical judgment.

8. The query-oriented event recognition system of claim 1, wherein the data comprises an image data and a sound data.

9. A query-oriented event recognition method, comprising the following steps of:
   a capturing unit capturing at least one data flow;
   an analysis and inference engine assembly analyzing and reasoning the plurality of data of the plurality of time points in the at least one data flow by the plurality of inference engines to generate at least one inference data corresponding to the data at each of time point;
   a synchronization processing unit generating an inference data set corresponding to each of the time points according to the at least one data flow and the at least one inference data; and
   an event definition unit finding an event query result matching up with the inference data set through a query statement.

10. The query-oriented event recognition method of claim 9, further comprising the step of:
    a judging and warning unit generating a warning signal according to the hazard level of the event query result.

11. The query-oriented event recognition method of claim 9, wherein the step of the event definition unit finding the event query result matching up with the inference data set through the query statement comprises the following steps of:
    a first event definition unit finding a first event query result matching up with the inference data set by a first query statement; and
    a second event definition unit finding a second event query result matching up with the first event query result and the at least one inference data by a second query statement.

* * * * *